United States Patent [19]

Chua

[11] Patent Number: 4,638,319
[45] Date of Patent: Jan. 20, 1987

[54] R.F. SYSTEM

[75] Inventor: Lye-Whatt Chua, South Nutfield, England

[73] Assignee: U.S. Philips Corporation, New York, N.Y.

[21] Appl. No.: 621,029

[22] Filed: Jun. 15, 1984

[30] Foreign Application Priority Data

Jun. 17, 1983 [GB] United Kingdom ............... 8316499

[51] Int. Cl.$^4$ ......................... G01S 5/02; G01S 13/46
[52] U.S. Cl. .................................... 342/417; 342/147
[58] Field of Search ............ 343/417, 427, 432, 16 R, 343/16 M

[56] References Cited

U.S. PATENT DOCUMENTS 3,824,595  7/1974  Hall ..................................... 343/432
4,366,483 12/1982  Hagedon et al. ............ 343/16 M X

FOREIGN PATENT DOCUMENTS 1337099 11/1973 United Kingdom .
1392343  4/1975 United Kingdom .
1402711  8/1975 United Kingdom .
2039187  7/1980 United Kingdom .
2061051  5/1981 United Kingdom ............ 343/16 R Primary Examiner—Theodore M. Blum
Assistant Examiner—Mark Hellnes
Attorney, Agent, or Firm—Robert J. Kraus

[57] ABSTRACT

A bearing indicating R.F. system comprising two spaced, broad-beam antennas supplying signals via power dividers to amplitude comparison means and phase comparison means, both operating without down-conversion to I.F. The main lobes of the radiation patterns of the antennas are inclined towards one another so that for non-normal incidence there is a difference between the amplitudes of signals received by the antennas. The amplitude comparison means comprises detector diodes, logarithmic amplifiers, and a first subtractor, the magnitude of the output signal (sensed with a threshold detector indicating which side of normal the radiation is incident. The phase comparison means comprises a hybrid ring having "sum" and "difference" output ports connected to an instantaneous frequency measuring apparatus and a detector diode, and further comprising logarithmic amplifiers and a second subtractor, the outputs of detector diodes in IFM being summed to provide a signal output connected to one amplifier. The output of the second subtractor is an accurate but ambiguous representation of the bearing angle with respect to normal (being an even function; the ambiguity can be resolved by reference to the output signal of the first subtractor which may also be used as an approximate representation of the bearing angle. Using broad-band R.F. components, the system may be operable over a broad bandwidth, e.g. an octave. A data comparator and a pulse repetition frequency filter control gates inhibiting the provision of bearing data except for pulsed incident radiation having desired frequency and PRF.

9 Claims, 2 Drawing Figures

R.F. SYSTEM

BACKGROUND OF THE INVENTION

The invention relates to an R.F. system for providing an at least approximate indication of the direction in which radiation is incident on the system from a distant source over an operating range of directions of incidence relative to the system. The R.F. system may be associated with means which tend to align the R.F. system with the direction of incidence of the radiation. The R.F. system may have a broad instantaneous bandwidth, for example an octave or more, and may furthermore be adapted to respond only to radiation having one or more characteristics satifying certain criteria, such as a frequency substantially equal to a predetermined value.

A known R.F. direction-finding system is that used in amplitude-comparison monopulse radar. This typically comprises a pair of parallel feeds arranged symmetrically in a reflector, giving respective narrow main-lobe radiation patterns with mutually-inclined respective axes crossing in front of the reflector. The outputs of the feeds are connected to two input ports of a hybrid ring; signals representing the algebraic sum of and the algebraic difference between the signals at the input ports appear respectively at two output ports of the hybrid ring. After translation to an intermediate frequency (I.F.), the signals derived from the output ports are subjected to further processing, including detection in such a manner as to provide a quantity whose magnitude is substantially independent of the amplitude of the incident radiation and is representative of the angle between the direction of incidence and boresight. Directions which are on opposite sides of boresight are distinguished by reference to the phase of the "difference" signal relative to the "sum" signal, there being a change of 180° in this relative phase on passing through boresight (the axis of symmetry of the reflector).

In monopulse radar, a broad instantaneous bandwidth is not required for the detection system, since the frequency of the transmitted signal is known at least approximately. However, the inherent limitation to a fairly narrow bandwidth due to the down-conversion to an I.F. means that such a system is unsuitable if it is desired to have a broad instantaneous bandwidth. Furthermore, for directions of incidence close to boresight, there may be difficulty in determining on which side of boresight the direction lies, since the difference signal tends to zero at boresight.

Another direction-finding system, which is known from UK Patent GB No. 2 037 116 B and which may have a broad instantaneous bandwidth, comprises an array of more than four antenna elements coupled to respective input ports of a microwave power dividing and phase transforming matrix. Phase comparators (which must operate at R.F. if the system is to be broadband) are coupled to output ports of the matrix. An unambiguous representation of bearing angle can be derived from the phase comparators. The required matrix is highly complex and very expensive, and will generally necessitate a respective R.F. amplifier between each antenna element and its respective matrix input port if the system is to have adequate R.F. sensitivity for signal levels likely to be encountered in practice. If the bearing representation is to be accurate, these amplifiers must track accurately in phase and at least fairly accurately in amplitude, further increasing the cost and complexity of the system.

A further known direction-finding system suitable for use over a broad bandwidth comprises an array of identical broadband antennas with their respective boresights disposed at regular angular intervals about a common point, and means for comparing the relative magnitude of signals derived from each pair of adjacent antennas. Even if the antenna radiation pattern is carefully selected, such a system tends not to be very accurate.

SUMMARY OF THE INVENTION

According to the invention, an R.F. system comprises two antenna means and further comprises phase comparison means and amplitude comparison means. Over an operating range of directions of incidence, relative to the system, for radiation incident on the system from a distant source, the phase difference between signals respectively derived by the two antenna means from the incident radiation is dependent on the direction of incidence. The magnitude of the signals relative to one another vary substantially monotonically with the direction of incidence. The phase comparison means and the amplitude comparison means each comprise diode detector means which in operation receive signals that are derived from, and are of the same frequency as, the signals derived by the two antenna means from the incident radiation. The phase comparison means are operable to derive a quantity whose value is dependent on the phase difference and varies with the direction of incidence in such a manner that with each of a plurality of values of the quantity there is associated a respective pair of directions of incidence, the two directions of each pair being respectively above and below a predetermined direction of incidence common to all the pairs. The amplitude comparison means are operable to derive an indication of the relative magnitude of signals respectively derived by the two antenna means from incident radiation in relation to a predetermined relative magnitude of such signals, the predetermined relative magnitude being associated with a direction of incidence which is substantially the common predetermined direction of incidence. This enables two directions of incidence which are both associated with the value of the quantity derived by the phase comparison means and which are respectively above and below the common predetermined direction of incidence to be distinguished.

Such a system enables the following advantages to be obtained:

(i) The system may be fairly simple (the absence of translation to I.F., contributing to the simplicity) and it may hence also be relatively inexpensive.

(ii) Also owing to the absence of translation to I.F., the system may be given a broad instantaneous bandwidth by the use of broadband R.F. components.

The two antenna means may comprise a pair of spaced, respective antennas having mutually-inclined respective main-lobe radiation patterns which jointly are substantially symmetrical about the direction associated with the predetermined relative magnitude, the predetermined relative magnitude corresponding to substantial equality of the magnitudes of the signals respectively derived by the two antenna means from the incident radiation.

In a particularly simple system, the phase comparison means and the amplitude comparison means may in operation receive respective portions of the signals derived by the two antenna means from the incident radiation; the repective portions may be supplied by a Wilkinson-type power divider which provides isolation between its outputs and which may be of broad bandwidth, for example as described in U.K. Patent Specification GB No. 1 330 408.

Suitably, the phase difference is zero for radiation incident from the common predetermined direction, and the value of the quantity may then be substantially an even function of the direction of incidence.

Suitably, the phase comparison means comprise a hybrid ring whereof two input ports are respectively coupled to the two antenna means, wherein in operation there appear respectively at two output ports thereof signals respectively representative of the algebraic sum of and the algebraic difference between the signals received at the input ports, and wherein the diode detector means of the phase comparision means comprise one or more respective diode detectors coupled to each of the two output ports. With such an arrangement, the directional resolution at low signal levels can if desired be improved simply by inserting a repective R.F. amplifier between each output port of the hybrid ring and the respective diode detector(s); these amplifiers do not need to track in phase, and may therefore be relatively inexpensive. For broadband operation, the hybrid ring may be as described in UK Patent Specification GB No. 1 321 978.

The desired quantity representative of the direction of incidence may be derived in a simple manner by two logarithmic amplifier means respectively coupled to the respective diode detectors for amplifying signals derived therefrom, and subtracting means coupled to the two logarithmic amplifier means for subtracting from one another signals respectively derived from the logarithmic amplifier means.

Suitably, the predetermined relative magnitude corresponds to substantial equality of the magnitudes of the signals respectively derived by the two antenna means from the incident radiation, and to derive the indication. The amplitude comparison means comprise comparator means coupled to the diode detector means thereof to indicate whether the magnitude of one of the signals is substantially greater than or substantially less than the magnitude of the other signal. The amplitude comparison means may in operation also provide a quantity representative of the approximate direction of incidence of the radiation; thus, the amplitude comparison means may provide a coarse bearing representation which may be of use when the conditions are such that the fine bearing representation provided by the phase comparison means cannot be relied upon.

A system embodying the invention may further comprise means responsive to the value of at least one parameter substantially characteristic of radiation incident on the system from any one source to inhibit the provision of the quantity and/or the indication at an output of the phase comparision means and the amplitude comparison means respectively unless the value satifies one or more criteria. Such further means may measure the value of a characteristic parameter, produce a quantity representative of the measured value, compare that quantity with a quantity representative of a predetermined value, and inhibit the provision unless any difference between the two lies within predetermined limits. As an alternative, the further means may be adapted to be inherently responsive only to radiation with a characteristic parameter lying within predetermined limits and to inhibit the provision unless such radiation is received. As an example of the former, the one parameter may be frequency, and in an embodiment of the invention wherein the phase comparison means comprise a hybrid ring, as set forth above, frequency measuring means may comprise a plurality of the diode detectors coupled to the port of the hybrid ring at which in operation the algebraic sum appears. As as example of the latter, the system may be adapted to be responsive to pulse radiation and a said parameter may be pulse repetition frequency.

BRIEF DESCRIPTION OF THE DRAWING

An embodiment of the invention will now be described, by way of example, with reference to the diagrammatic drawing, in which.

DESCRIPTION OF THE PREFERRED EMBODIMENT

Figure 1:
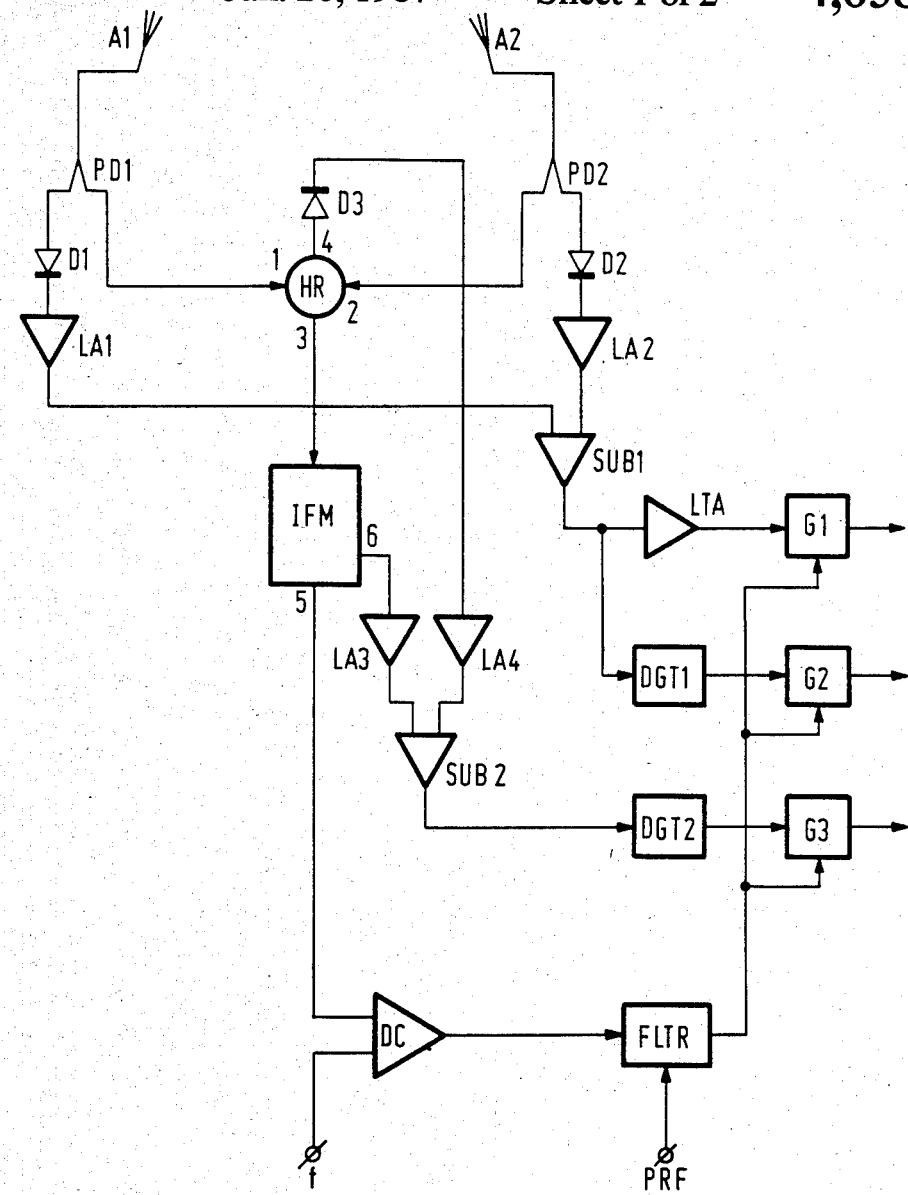
FIG. 1 is a schematic circuit diagram of an embodiment of the invention.

Referring to FIG. 1, two spaced, broad-beam, broad-bandwidth microwave antennas A1 and A2 are disposed so that the axes of their main lobes cross in front of the baseline of the pair of antennas, the axes being inclined at equal but opposite angles to the normal bisecting the baseline. The antennas are connected by paths of equal electrical lengths to respective two-way power dividers PD1, PD2. A first output of each power divider is connected to a respective square-law detector diode D1, D2 whose output is connected to the input of a respective video logarithmic amplifier LA1, LA2. The out puts of the two logarithmic amplifiers are respectively connected to the two inputs of a subtractor SUB1.

The second output of each of the power dividers PD1, PD2 is connected to a respective port 1,2 of a broadband 4-port hybrid ring HR which is such that in operation there appear respectively at ports 3 and 4 thereof signals respectively representative of the algebraic sum of and the algebraic difference between the signals received at ports 1 and 2. Port 4 (the "difference" port) is connected to a square-law detector diode D3 while port 3 (the "sum" port) is connected to the input of an instantaneous frequency measuring apparatus IFM. Suitably, this is generally as described in UK Patent Specification GB No. 1 385 111 and comprises one or more microwave frequency discriminators each as shown in FIG. 1 thereof wherein two phase comparison means each with two inputs have respective first inputs connected by paths of equal electrical lengths to an in-phase power divider and respective second inputs connected by paths of different electrical lengths to a quadrature directional coupler; the in-phase power divider and quadrature directional coupler are connected to the outputs of a further in-phase power divider whose input is coupled to the input of the apparatus. A digital code representative of the frequency of the signal supplied to the input of the apparatus is derived from detector diodes of the pair of phase comparison means of the or each frequency discriminator, and in this case is provided at an output 5 of the apparatus IFM. The apparatus IFM in this case further includes means, suitably comprising a buffer amplifier, for summing the signals produced by all the detector diodes thereof, this sum being provided at a further output 6.

The signals from the output 6 of IFM and from the detector diode D3 are applied to the inputs of respective video logarithmic amplifiers LA3, LA4 whose outputs are respectively connected to the two inputs of a subtractor SUB2.

Now it can be shown that if $2\phi$ is the phase difference between signals respectively derived by the antennas A1 and A2 from radiation incident on the system from the same distant source, the signals supplied to the inputs of logarithmic amplifiers LA3 and LA4 are respectively proportional to $\cos^2\phi$ and $\sin^2\phi$. The phase difference $2\phi$ is related to the bearing angle $\alpha$ (measured with respect to the normal bisecting the baseline of the antennas, radiation incident from this direction giving a phase difference $2\phi$ of zero) by the equation $$2\phi = d \sin \alpha / \lambda$$

where $\lambda$ is the wavelength of the incident radiation, and d is the spacing of the antennas. For $\phi \neq 0$, i.e. non-normal incidence, the signals at the inputs of LA3, LA4 will also include respective factors representing the different amplitudes of the respective signals derived by the antennas A1 and A2 from the incident radiation. The system parameters, particularly the beamwidth of each of the antennas, are chosen so that over the desired operating range of bearing angles, the rate of variation with the bearing angle of the ratio of the amplitude factors is much less than that of the ratio of the trigonometric factors ($\cos^2\phi$ and $\sin^2\phi$); for this purpose, the amplitude factors can therefore be taken as approximately equal, and hence the subtractor SUB2 produces a quantity approximately representative of $\log \tan^2\phi$.

Now $\tan \phi$ is an odd function of $\phi$; hence $\tan^2\phi$ is an even function of $\phi$ (having a turning point at $\phi = 0$) and $\log \tan^2\phi$ is also an even function of $\phi$ (but has a discontinuity at $\phi = 0$). Since (i) $\sin \alpha$ is an odd function of $\alpha$,
(ii) $\phi$ is directly proportional to $\sin \alpha$, and
(iii) $\tan \phi$ is an odd function of $\phi$, $\tan \phi$ is an odd function of $\alpha$, and therefore $\tan^2\phi$, and hence also $\log \tan^2\phi$, is an even function of $\alpha$. Furthermore, the contribution, resulting from the above-mentioned amplitude factors, to the output quantity of SUB2 is also an even function of $\alpha$. Hence, with each of a plurality of values of the quantity produced by the subtractor SUB2 there is associated a respective pair of directions, the two directions of each pair being at equal but opposite angles to the normal. With input signals to the amplifiers LA3, LA4 of magnitude such that one or both amplifiers does not operate logarithmically, for example with very small input signals to the amplifier LA4 (as may occur with directions of incidence close to normal) which result in that amplifier's output signal tending to noise, the quantity produced by the subtractor SUB2 may not accurately represent the magnitude of the bearing angle; however, there should be a respective pair of directions corresponding to each value of the quantity produced by SUB2 resulting from input signals to LA3, LA4 at least in the range over which both those amplifiers operate logarithmically.

A distinction between the two directions of each pair is derived by the subtractor SUB1 from the diodes D1 and D2 which produce signals respectively representative of the above-mentioned amplitude factors. Although with the broad-beam antennas used, these factors vary only slowly with bearing, there is a slight but detectable difference between the peak amplitudes of the signals derived by the two antennas from radiation incident non-normally on the system, the larger amplitude being obtained from the antenna to whose main-lobe axis the direction of incidence is closer. The magnitude of these amplitudes relative one to the other, expressed for example as the ratio of one to the other or as the difference (positive or negative) between one and the other, is a substantially monotonic function of the bearing angle $\alpha$ over a wide range of directions of incidence. The output of subtractor SUB1 represents the logarithm of the ratio of these amplitudes; since the ratio has the predetermined value of unity for normal incidence (assuming the antennas to be identical), the sign of the output of subtractor SUB1 is positive for directions on one side of normal and negative on the other side, while the magnitude of the output is approximately representative of the angle to the normal.

The sign of the output of subtractor SUB1 can be derived by a limiting amplifier LTA which produces either a logic 1 or a logic 0 (SIGN) according as the sign is positive or negative. A digitiser DGT1 derives from the magnitude of the output of subtractor SUB1 an unambiguous but approximate representation (COARSE) of the bearing angle $\alpha$. Analogously, a further digitiser DGT2 derives from the output of subtractor SUB2 a more accurate but ambiguous representation (FINE) of the angle, the ambiguity being resolvable by reference to the SIGN output derived from subtractor SUB1. The outputs from the limiting amplifer LTA and the digitisers DGT1, DGT2 are supplied to respective gates G1–G3, which will be referred to in more detail below.

The representation of bearing derived from the subtractor SUB2 is a function of the frequency of the incident radiation, the phase difference $2\phi$ for radiation incident from any particular direction being directly proportional to the frequency. In a broad-band system such as this embodiment, the representation may therefore vary considerably over the operating frequency range. A representation of bearing which is independent of frequency can be obtained utilising the representation of measured frequency provided at output 5 of the instantaneous frequency measuring apparatus IFM, for example by inserting between the output of the subtractor SUB2 and the input of the digitiser DGT2 a further subtractor which subtracts from the output signal of the subtractor SUB2 a signal representative of the logarithm of the frequency measured by IFM.

To improve the fine bearing resolution at low signal levels, a respective R.F. amplifier may be inserted between port 3 of the hybrid ring HR and the input of the instantaneous frequency measuring apparatus IFM and between port 4 of the hybrid ring and detector diode D3. If an accurate bearing representation is desired, these amplifiers should preferably track fairly well in gain, but they do not need to track in phase, thereby enabling relatively inexpensive amplifiers to be used. However, where for example the R.F. system is associated with means which tend to align the R.F. system approximately with the direction of incidence of the radiation, close tracking in gain may not be necessary, and it may also not be necessary for the fine bearing representation to be made independent of frequency.

The range of bearing angles $\alpha$ over which a useful fine bearing representation can be derived will depend on the spacing of the antennas, their main-lobe beamwidths, the angle at which the main lobes are inclined to the direction $\alpha = 0$, and the operating frequency. Depending on the values of these parameters, the phase difference between the signals derived by the two antennas may exceed 180° for directions of incidence well away from the normal, in which case a further ambiguity may be present in the fine bearing representation: this further ambiguity may (if desired) be resolvable by reference to the coarse bearing representation. The range of bearing angles over which a useful coarse bearing representation can be derived may be much larger than the range of bearing angles over which a fine bearing representation, based on an unambiguous phase difference between the antennas (i.e. a phase difference of less than ±180°), can be derived.

This embodiment of the invention is adapted to be responsive to pulsed incident radiation, more specifically to the values of two characteristic parameters thereof namely frequency and pulse repetition frequency, and to inhibit the provision of information on the direction of incidence unless the parameters satisfy predetermined criteria. The representation of frequency (in this case in the form of a Johnson code) provided by the instantaneous frequency measuring apparatus IFM at its output 5 is compared in a data comparator DC with a code representative of a predetermined frequency f. Only if the measured frequency lies within preset limits with respect to the predetermined frequency is a pulse produced at the output of the data comparator DC. Successive pulses of incident radiation with a frequency satisfying this condition will result in the production of corresponding successive pulses from the data comparator DC, the output of which is connected to the input of a pulse repetition frequency filter FLTR which compares the repetition frequency of the pulses with a predetermined value of pulse repetition frequency PRF. Only if the actual value of the pulse repetition frequency lies within preset limits with respect to the predetermined value is an output pulse produced by the filter FLTR. Such an output pulse opens three gates G1, G2, G3 to which the outputs of the limiting amplifier LTA and the digitisers DGT1, DGT2 are respectively connected, enabling the provision of an indication of the sign of the bearing (to one or the other side of normal) and representations of coarse and fine bearing respectively. The pulse repetition frequency filter FLTR may for example comprise a tapped delay line and a further gate connected to a selected output tap of the delay line, the delay line providing between its input and the selected output tap a delay which corresponds approximately to the desired pulse repetition frequency. The input of the delay line constitutes the input of the filter FLTR and the output of the gate constitutes the output of the filter. This further gate may be controlled so that it is opened for a short interval by the arrival of a pulse from the data comparator DC at the filter input. Thus an output pulse appears at the filter output only if a pulse received from the data comparator reaches the selected output tap of the delay line during the above-mentioned short interval following the arrival of a subsquent pulse from the data comparator at the filter input, the delay time and the short interval being such that this occurs only if the period between the arrival of successive pulses at the filter input corresponds to a pulse repetition frequency lying in a small range about the desired value. Thus the gates G1-G3 are controlled so that bearing information is provided on the arrival of a second or subsequent pulse of a train with substantially the desired frequency and pulse repetition frequency, and is not provided in relation either to a pulse of substantially different frequency which happens to arrive at the same time as a pulse of a train with the desired parameter values, or to a pulse with the desired (or indeed any) frequency which does not arrive at approximately the same time as a pulse of a train with the desired parameter values.

It may be noted that in comparing the propagation times of signals from ports 3 and 4 of the hybrid ring HR to the inputs of the subtractor SUB2, the relative delay in the path from port 3 produced by the apparatus IFM in comparison with the diode D3 in the path from port 4 will generally be negligible, amounting to some nanoseconds.

The antennas A1 and A2 suitably are identical, and may each be of the travelling-wave kind disclosed in UK Patent Specification GB No. 1 601 441. This kind of antenna can be of a compact, generally planar form on a dielectric substrate; it can have ample bandwidth for a broadband system (an antenna bandwidth of 3:1 is readily achievable), and can have a suitable beamwidth which furthermore varies relatively little with frequency. The 3dB beamwidth of each antenna may for example be 70°, and the angle at which the antennas are mutually inclined may for example be 10°. The two antennas may for example be formed on respective substrates (both perpendicular to the plane of FIG. 1). The generally planar structure of the antennas permits then to be closely spaced if desired, and their travelling-wave mode of operation results in low interaction even if closely spaced.

The power dividers PD1 and PD2 may provide 3dB (i.e. equal) power division, and may be of the conventional Wilkinson type comprising a pair of quarter-wavelength arms connected directly together at one end (the input) and coupled through a discrete resistor at their other end (the output) to provide mutual isolation between the outputs; such a power divider has a bandwidth of about an octave. For a system of broader bandwidth, the arms of the power divider may comprise a plurality of successive quarter-wavelength sections, the arms being coupled either by discrete resistors between the ends of corresponding sections in the two arms, or by a continuous resistive layer as disclosed in the above-mentioned UK Patent Specification GB No. 1 330 408.

For broadband operation, the hybrid ring HR may be of the kind disclosed in the above-mentioned UK Patent Specification GB No. 1 321 978.

The logarithmic amplifiers LA1-4 may be such that in addition to providing a substantially linear variation of output voltage with input power over the portion of the characteristic of each of the diodes D1-4 that is substantially square-law, they also provide some compensation for the flattening of the characteristic as the diode begins to saturate, and thus increase the dynamic range.

Figure 2:
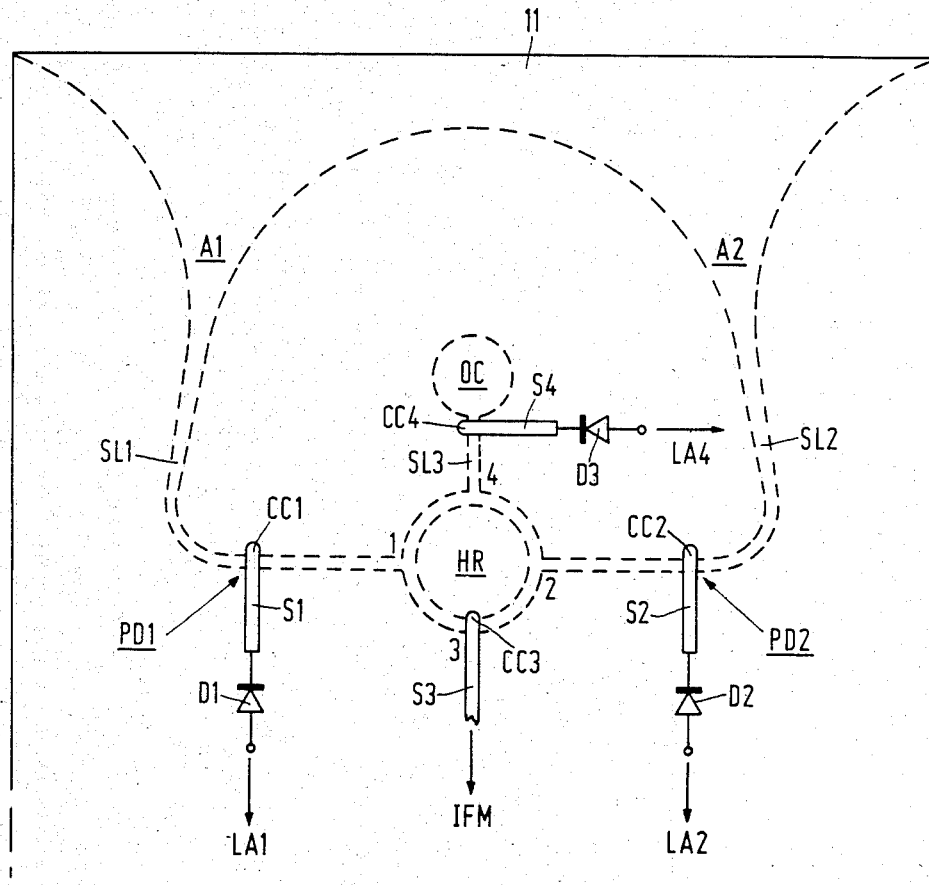
FIG. 2 shows schematically one form that part of the R.F. circuit of an embodiment may take.

As an alternative to the above-mentioned formation of the antennas on respective substrates, the pair of antennas may be formed on the same substrate and may be integrated with at least part of the microwave circuit, as depicted in FIG. 2 which is a schematic plan view of a dielectric substrate 11 having on its upper surface strip conductors and on its lower surfaces a ground plane in which slots (indicated by dashed lines) are formed. Each of the antennas A1, A2 is formed by a respective tapering slot SL1, SL2 in the ground plane, the width of the slot at the mouth of the antenna being not substantially less than half a wavelength at the lowest frequency in the operating frequency range of the system. Each slot tapers from its mouth, where microwave energy in the operating frequency range is bound relatively loosely to the slot, down to a uniform narrow width where it forms a slot transmission line to which the microwave energy is relatively closely bound. The power dividers PD1, PD2 comprise respective strip conductors S1, S2 on the upper surface of the substrate crossing the respective slot lines SL1, SL2 defined in the ground conductor on the lower surface of the substrate, each strip conductor being conductively connected through the substrate to the ground conductor immediately adjacent the respective slot at CC1, CC2 respectively so that the strip conductors are respectively coupled to the slot lines. The slots SL1, SL2 form the two input ports 1, 2 of the hybrid ring HR which comprises a ring of slotline. One output port (3) of the hybrid ring comprises a further strip conductor S3 crossing the slotline ring and conductively connected to the ground plane adjacent the slot at CC4, and the other output port (4) comprises a further slotline SL3 which terminates in an open-circuit OC, another strip conductor S4 being coupled thereto with a conductive connection to the ground plane at CC4. The diodes D1, D2 and D3 are respectively connected to the strip conductors S1, S2 and S4. The strip conductor S3 is connected to the input of the instantaneous frequency measuring apparatus IFM, the microwave circuit of which may be integrated on the same substrate.

The microwave circuit of an embodiment of the invention, such as that described with reference to FIG. 2, may where desired readily be designed and made to be accurately symmetrical, and being also predominantly passive may be relatively inexpensive.

I claim:

1. An R.F. direction-finding system for determining the direction of incidence R.F. radiation without down conversion to I.F., said system comprising:
   (a) first and second antennas disposed on opposite sides of a direction-indicating axis and having respective main lobe axes angled such that they intersect on said direction-indicating axis;
   (b) first and second diode detector means each coupled to both of the first and second antennas;
   (c) phase comparison means coupled to the first diode detector means for producing a single signal having a magnitude which varies continuously with the direction of incidence of R.F. radiation over a predefined operating range, said magnitude representing first and second angles of incidence on opposite sides of a predefined direction, one of said first and second angles being the actual direction of incidence of the R.F. radiation; and
   (d) amplitude comparison means coupled to the second diode detector means for producing a signal having a magnitude r
   (d) amplitude comparison means coupled to the second diode detector means for producing a signal having a magnitude representing the relative magnitudes of signals produced by the first and second antennas in response to the incident R.F. radiation, said magnitude approximately representing the direction of incidence of the R.F. radiation relative to said predefined direction, said signal designating which of the angles determined by the phase comparison means accurately represents the direction of incidence of the R.F. radiation.

2. A system as in claim 1 where said main lobes are symmetrical with respect to said direction indicating axis, and where said predefined direction is defined by said direction indicating axis.

3. A system as in claim 1 or 2 where the phase comparison means and the amplitude comparison means are coupled to the first and second antennas through power divider means.

4. A system as in claim 1 or 2 where the first diode detector means are coupled to the antennas by means of a hybrid ring having first, second, third and fourth ports, the first and second ports comprising input ports which are coupled to the first and second antennas, respectively, and the third and fourth ports comprising output ports which are coupled to the first diode detector means, said third and fourth ports respectively providing the algebraic sum and the algebraic difference of signals received at the output ports.

5. A system as in claim 4 where the first diode detector means comprises first and second diodes coupled to the third and fourth output ports of the hybrid ring, respectively, and where the phase comparison means comprises first and second logarithmic amplifiers having inputs coupled to said first and second diodes, respectively, and a subtracting means coupled to outputs of said first and second logarithmic amplifiers for subtracting signals produced by said amplifiers.

6. A system as in claim 1 or 2 where the second diode detector means comprises first and second diodes coupled to the first and second antennas, and where the amplitude comparison means comprises first and second logarithmic amplifiers having inputs coupled to said first and second diodes, respectively, and a subtracting means having first and second inputs coupled to outputs of said first and second logarithmic amplifiers for subtracting signals produced by said amplifiers.

7. A system as in claim 2 comprising means responsive to a predefined value of at least one parameter which is characteristic of a type of radiation to be detected by the system, said means being coupled to the phase comparison means and the amplitude comparison means for inhibiting the production of output signals thereby unless said value satisfies a predefined criteria.

8. A system as in claim 7 where said parameter is frequency.

9. A system as in claim 7 where said parameter is pulse repetition frequency.

* * * * *